United States Patent
Schmidt et al.

(10) Patent No.: US 12,283,088 B2
(45) Date of Patent: Apr. 22, 2025

(54) METHOD AND SYSTEM FOR DETERMINING A DRIVING CORRIDOR

(71) Applicant: ZF AUTOMOTIVE GERMANY GMBH, Alfdorf (DE)

(72) Inventors: Manuel Schmidt, Dortmund (DE); Christian Wissing, Dortmund (DE); Andreas Homann, Dortmund (DE); Christian Lienke, Gelsenkirchen (DE); Torsten Bertram, Düsseldorf (DE); Martin Krüger, Lossatal (DE); Till Nattermann, Krefeld (DE); Karl-Heinz Glander, Monheim (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 562 days.

(21) Appl. No.: 17/295,503

(22) PCT Filed: Nov. 21, 2019

(86) PCT No.: PCT/EP2019/082060
§ 371 (c)(1),
(2) Date: May 20, 2021

(87) PCT Pub. No.: WO2020/104579
PCT Pub. Date: May 28, 2020

(65) Prior Publication Data
US 2022/0004781 A1   Jan. 6, 2022

(30) Foreign Application Priority Data
Nov. 22, 2018   (DE) .......................... 102018129485.9

(51) Int. Cl.
*G06V 20/56*   (2022.01)
*G06F 18/214*   (2023.01)
(Continued)

(52) U.S. Cl.
CPC .......... *G06V 10/764* (2022.01); *G06F 18/214* (2023.01); *G06F 18/2431* (2023.01);
(Continued)

(58) Field of Classification Search
CPC ...... G06V 10/764; G06V 10/82; G06V 10/95; G06V 20/588; G06F 18/214;
(Continued)

(56) References Cited

U.S. PATENT DOCUMENTS 9,286,524 B1   3/2016 Mei et al.
2014/0320644 A1   10/2014 Hegemann et al.
(Continued)

FOREIGN PATENT DOCUMENTS

DE   102018131477 A1   6/2019
EP   2924614 A1   9/2015

OTHER PUBLICATIONS

Chougule, Shriyash, et al. "Reliable multilane detection and classification by utilizing CNN as a regression network." Proceedings of the European conference on computer vision (ECCV) workshops. 2018. (Year: 2018).*
(Continued)

*Primary Examiner* — Siamak Harandi
*Assistant Examiner* — Denise G Alfonso
(74) *Attorney, Agent, or Firm* — ROSSI, KIMMS & McDOWELL LLP

(57) ABSTRACT

The invention relates to a method for determining a driving corridor for a motor vehicle (1). The motor vehicle (10) comprises at least one camera (22) and a control unit (24), the camera (24) being designed to generate images of a front region (30) in front of the motor vehicle (10) and to forward these images to the control unit (24). The control unit (24) comprises a machine learning module (28) having an artificial neural network. The method comprises the following
(Continued)

steps: an image of the front region (30) in front of the motor vehicle (10) is obtained by the at least one camera (22); characteristic image features of the image are extracted by means of the artificial neural network; by means of the same artificial neural network, image points (32) which delimit the driving corridor of the motor vehicle (10) and/or at least one driving corridor adjacent to the driving corridor are determined on the basis of the extracted characteristic image features. The invention also relates to a system (20) for determining a vehicle corridor.

12 Claims, 4 Drawing Sheets

(51) Int. Cl.
  *G06F 18/2431* (2023.01)
  *G06N 3/04* (2023.01)
  *G06N 3/08* (2023.01)
  *G06V 10/764* (2022.01)
  *G06V 10/82* (2022.01)
  *G06V 10/94* (2022.01)
  *B60W 60/00* (2020.01)

(52) U.S. Cl.
  CPC ............... *G06N 3/04* (2013.01); *G06N 3/08* (2013.01); *G06V 10/82* (2022.01); *G06V 10/95* (2022.01); *G06V 20/588* (2022.01); *B60W 60/001* (2020.02); *B60W 2420/403* (2013.01)

(58) Field of Classification Search
  CPC ........ G06F 18/2431; G06N 3/04; G06N 3/08; B60W 60/001; B60W 2420/42
  See application file for complete search history.

(56) References Cited

U.S. PATENT DOCUMENTS

2015/0278613 A1  10/2015  Takemae et al.
2017/0039436 A1  2/2017  Chen et al.

OTHER PUBLICATIONS

John, Vijay, et al. "Real-time lane estimation using deep features and extra trees regression." Image and Video Technology: 7th Pacific-Rim Symposium, PSIVT 2015, Auckland, New Zealand, Nov. 25-27, 2015, Revised Selected Papers 7. Springer International Publishing, 2016. (Year: 2016).*
Wang, Ze, Weiqiang Ren, and Qiang Qiu. "Lanenet: Real-time lane detection networks for autonomous driving." arXiv preprint arXiv:1807.01726 (2018). (Year: 2018).*
Shriyash Chougule et al. Reliable Multilane Detection and Classification by Utilizing CNN as a Regression Network—ECCV 2018 Workshop Paper.
Kim Jiman et al. End-To-End Ego Lane Estimation Based on Sequential Transfer Learing for Self-Driving Cars—2017 IEEE Conference on Computer Vision and Pattern Recognition Workshops— pp. 1194-1202.
Annika Meyer et al. "Deep Semantic Lane Segmentation for Mapless Driving"—2018 IEEE/RSH International Conference on Intelligent Robots and Systems (ROS) Madrid, Spain, Oct. 1-5, 2018 pp. 869-875.
John Vijay et al. Real-Time Lane Estimation Using Deep Features and Extra Trees Regression.
International Search Report issued in Intl. Appln. No. PCT/EP2019/082060 mailed Feb. 21, 2020. English translation provided.
Written Opinion issued in Intl. Appln. No. PCT/EP2019/082060 mailed Feb. 21, 2020. English translation provided.
Office Action issued in Chinese Appln. No. 201980077273.7 mailed Sep. 29, 2023. English machine translation provided.
Office Action issued in European Appln. No. 19812933.0 mailed Apr. 19, 2023.
Office Action issued in Chinese Appln. No. 201980077273.7 mailed Mar. 16, 2024. English machine translation provided.

* cited by examiner

METHOD AND SYSTEM FOR DETERMINING A DRIVING CORRIDOR

RELATED APPLICATIONS

This application filed under 35 U.S.C § 371 is a national phase application of International Application Serial Number PCT/EP2019/082060 filed Nov. 21, 2019, which claims the benefit of German Application No. 10 2018 129 485.9 filed Nov. 22, 2018, the subject matter of which are incorporated herein by reference in their entirety.

TECHNICAL FIELD

The invention relates to a method for determining a driving corridor, to a control device for a system for determining a driving corridor, to a system for determining a driving corridor, to a computer program for performing the method and to a computer-readable data carrier containing such a computer program.

Many modern motor vehicles have driver assistance systems that control a subsystem or several subsystems of the motor vehicle in an at least partially automated manner. One example of these are active lane keeping systems that recognize unintentional departure from a lane and counteract this by actively intervening in the vehicle steering and/or the vehicle acceleration. These driver assistance systems thus control a longitudinal and/or transverse movement of the motor vehicle in an at least partially automated manner.

Such driver assistance systems are often based on at least one camera that generates images of surroundings of the motor vehicle. The images are processed automatically by way of image processing algorithms and the driver assistance system controls the motor vehicle in an at least partially automated manner, in particular in a fully automated manner, based on the processed images. By way of example, a driving corridor that corresponds to a lane to be kept in is ascertained for the lane keeping assistant based on the processed images.

In particular in rural areas, it is often the case that not all road markings are present, for example center markings may be missing on narrower roads. However, there are also road sections in urban areas in which the road markings may be missing, for example in the area of construction sites or pedestrian zones. In other urban areas, in particular in the area of busy intersections, the road markings may be highly complex and/or overlap, and/or the markings may be temporarily covered by other motor vehicles. Current image processing algorithms do not provide reliable results for the driving corridor of the motor vehicle in all of these situations.

SUMMARY

The object of the invention is therefore to provide a method and a system for determining a driving corridor of a motor vehicle, which method and system guarantee reliable and robust recognition of the driving corridor in a large number of different situations.

The object is achieved according to the invention by a method for determining a driving corridor for a motor vehicle. The motor vehicle has at least one camera and a control device, wherein the camera is designed to generate images of a front area ahead of the motor vehicle and to forward them to the control device. The control device comprises a machine learning module containing an artificial neural network. The method comprises the following steps:

an image of the front area ahead of the motor vehicle is obtained from the at least one camera;

characteristic image features of the image are extracted by way of the artificial neural network; and image points that delimit the driving corridor of the motor vehicle and/or at least one driving corridor adjacent to the driving corridor are determined by way of the same artificial neural network, based on the extracted characteristic image features.

According to the invention, all of the steps of the method are carried out by the same machine learning module. More precisely, both the characteristic image features of the image and the driving corridor are determined by the same neural network. It has been found that a particularly reliable and robust determination of the driving corridor and/or of adjacent driving corridors is thereby achieved.

Here and hereinafter, a "driving corridor" is understood to be an area on a road, on a track or the like in which the motor vehicle is able to move safely. This is for example a marked lane or an area of an unmarked road or of a track that corresponds to a lane. There is accordingly always a driving corridor in which the motor vehicle is currently located, this being referred to below as "current driving corridor". Furthermore, for example on roads having several lanes per direction of travel, there are sections in which at least one further possible driving corridor for the motor vehicle runs adjacent to the current driving corridor of the motor vehicle.

The method according to the invention is used to determine those image points that delimit the current driving corridor of the motor vehicle and/or at least one driving corridor adjacent to the current driving corridor of the motor vehicle. The image points in this case constitute lateral boundaries of the corresponding driving corridor. Seen from the perspective of a driver of the motor vehicle, the image points each form part of a left-hand or right-hand boundary of the corresponding driving corridor. In other words, at least one possible driving corridor, preferably a plurality of possible driving corridors, is thus ascertained for the motor vehicle, since two mutually opposing lateral boundaries define the corresponding driving corridor.

The same artificial neural network preferably additionally determines a number of existing driving corridors, in particular a number of driving corridors that are adjacent to the current driving corridor of the motor vehicle.

The artificial neural network is preferably a neural network that, in addition to an input and an output layer, has a plurality of intermediate layers. The artificial neural network is accordingly trained using "deep learning" methods.

One aspect of the invention makes provision for the extraction of the characteristic image features to correspond to a classification of image areas of the image into in each case one or more categories. By way of example, the individual image areas are grouped into one or more of the following categories: Road, no road, passable track, impassable terrain, road marking, road boundary, traffic sign, motor vehicle, cyclist, pedestrian, other road user, etc. In this step, at least those image areas that are relevant for determining the at least one driving corridor are identified and categorized. By way of example, road markings are an important indicator of the presence of a driving corridor, but cannot necessarily be used as the only feature for this, since they are incorrect or simply absent in some road sections, for example in the area of construction sites.

The image areas are classified in particular by way of image recognition methods performed by the artificial neural network. The artificial neural network is accordingly trained to group the individual image areas into one or more of the categories described above.

According to a further aspect of the invention, the image points comprise a height coordinate and a width coordinate, wherein the value of one of the coordinates, in particular the height coordinate, is set to at least one search value in order to determine the image points, and only the value of the other of the coordinates, in particular the width coordinate, is determined. In other words, the image points are thus ascertained along certain search lines, that is to say all of the points at which the corresponding coordinate corresponds to the search value, which run in an image area relevant for ascertaining the at least one driving corridor. The search lines may in this case be predefined or be ascertained by the artificial neural network itself. Accordingly, one of the coordinates of the image points is already defined, and the artificial neural network needs only in each case to ascertain the other of the two coordinates of the image points, thereby saving computing time.

By way of example, in each case four image points are ascertained for both lateral boundaries of the at least one driving corridor. The image points are accordingly ascertained along four search lines. It has been found that ascertaining four image points per lateral boundary of the corresponding driving corridor provides a good compromise between a robust recognition of the driving corridor and the shortest possible computing time.

At least two image points are preferably determined for each search value, wherein the image points correspond to a left-hand boundary of at least one of the driving corridors and a right-hand boundary of the same driving corridor. In the case of more than one existing driving corridor, more image points are accordingly ascertained per search value. By way of example, in the case of two existing driving corridors, three image points are ascertained per search value, since the two driving corridors share those image points that separate the two driving corridors from one another. In general, in the case of n existing driving corridors, (n+1) image points are ascertained per search value, where n is a natural number greater than zero.

In other words, the set of determined image points may contain pairs consisting of an image point that is assigned to the left-hand boundary of a driving corridor and an image point that is assigned to the right-hand boundary of the same driving corridor, wherein the image points of a pair have the same coordinate. As already explained above, the same coordinate is in particular the height coordinate.

The artificial neural network in particular has at least one first subnetwork and at least one second subnetwork, wherein the first subnetwork, which is in particular constructed as a convolutional network, extracts the characteristic image features and/or wherein the second subnetwork, which is constructed in particular as a regression-based network, determines the image points. The artificial neural network thus comprises two interconnected subnetworks, wherein the first subnetwork specializes in extracting the characteristic image features, and wherein the second subnetwork specializes in determining the image points based on the characteristic image features extracted by the first subnetwork, in particular by way of regression analysis. It has been found that a combination of the two subnetworks enables a particularly reliable and robust determination of the image points.

Preferably, the determined image points are used as a basis for ascertaining at least one result curve that laterally delimits the determined driving corridor, in particular wherein the result curve is a cubic spline or a Bézier spline. In other words, lateral boundary lines are thus ascertained for the corresponding driving corridor. The ascertained image points in this case serve as support points for interpolation of the at least one result curve.

The result curve may likewise be ascertained by the artificial neural network.

As an alternative, however, the result curve may also be formed outside the machine learning module, for example created by a corresponding computer program that runs on the control device, since the result curves may also be interpolated based on the known coordinates of the determined image points without machine learning, in particular without deep learning. In this case, the machine learning module, or rather the artificial neural network, with the image points, supplies the support points for the interpolation of the at least one result curve, while the actual result curve is then not ascertained by the artificial neural network.

A further aspect of the invention makes provision for the artificial neural network to be trained with target training data, wherein the target training data comprise images generated by way of the camera and information about actual characteristic image features present in the images and/or actual image points delimiting at least one driving corridor, comprising the following training steps:

forward-feeding the target training data to the artificial neural network;

ascertaining characteristic image features and/or image points delimiting the at least one driving corridor by way of the artificial neural network;

determining an error between the ascertained characteristic image features and the actual characteristic image features and/or determining an error between the ascertained image points and the actual image points; and changing weighting factors of the neural network by feeding back the error to the artificial neural network.

Feeding back the error to the artificial neural network preferably changes the weighting factors of the neural network such that the error is minimized. Of course, "no error" may also be determined as an error.

In other words, the artificial neural network is thus trained to extract or to ascertain the characteristic features and/or the image points with the smallest possible error.

According to one possible refinement of the invention, squared Euclidean distances between the ascertained image points and the actual image points and/or between points on the at least one result curve and points on a corresponding actual result curve are used to ascertain the error, in particular wherein the respective squared Euclidean distances are summed and/or averaged. The actual result curve in this case corresponds to the curve that is created by interpolating the actual image points.

The squared Euclidean distance between the ascertained image points and the actual image points or between the points on the at least one result curve and the points on the corresponding actual result curve which, as described above, lie on a search line is preferably ascertained in each case.

More preferably, the target training data additionally contain an actual number of existing driving corridors, such that the artificial neural network is additionally trained to ascertain the number of driving corridors. In particular, the number of driving corridors adjacent to the current driving corridor of the motor vehicle is in this case ascertained.

According to a further refinement of the invention, provision is made for the artificial neural network, in particular the first subnetwork, to be initially trained in a first training step with target training data that contain images generated by way of the camera and information about actual characteristic image features present in the images, and for the artificial neural network, in particular the second subnetwork, to then be trained in a second training step with target training data that contain images generated by way of the camera and corresponding actual image points delimiting at least one of the driving corridors.

In the first training step, the artificial neural network is thus initially trained only to extract the characteristic image features. Then, in the second training step, the artificial neural network is trained to determine the image points based on the extracted characteristic image features, in particular by way of regression analysis. However, the two training steps are not independent of one another, since the second training step also influences the image recognition capabilities of the artificial neural network, more precisely the extraction of the characteristic image features. It has been found that an artificial neural network trained in this way delivers particularly robust and reliable results for the image points.

In the first or in an additional training step, a restriction may also be made with regard to a determined characteristic image feature, for example with regard to the image feature "road—no road", in order to guarantee particularly reliable recognition.

According to a further aspect of the invention, the determined image points, the one or more result curves and/or further information, based on the determined image points, about the determined driving corridor are transmitted to at least one driver assistance system of the motor vehicle. The driver assistance system then controls the motor vehicle hi an at least partially automated manner based on the transmitted data and/or information. The driver assistance system is for example a brake assistant, a lane keeping assistance system and/or a lane change assistance system.

The object is furthermore achieved according to the invention by a control device for a system for determining a driving corridor for a motor vehicle, having a machine learning module that comprises an artificial neural network, wherein the control device is designed to perform a method as described above. For this purpose, the control device is able to be connected to a camera of the motor vehicle so as to transmit signals, and is able to receive images from the camera.

Reference is made to the above explanations with regard to the advantages.

The object is also achieved according to the invention by a system for determining a driving corridor for a motor vehicle, having a control device as described above and at least one camera that is designed to generate images of a front area ahead of the motor vehicle and to forward them to the control device.

The method described above for determining a driving corridor for a motor vehicle is thus carried out automatically by the control device, more precisely by the machine learning module of the control device. Reference is made to the above explanations with regard to the method in respect of the advantages.

The object is also achieved according to the invention by a computer program having program code means for performing the steps of a method as described above when the computer program is executed on a computer or a corresponding processing unit, in particular on a processing unit of a control device as described above. The machine learning module described above in the context of the method and/or the artificial neural network described above in the context of the method form or forms at least part of the computer program, in particular the entire computer program.

"Program code means" are understood here and hereinbelow to be computer-executable instructions in the form of program code and/or program code modules in compiled and/or uncompiled form, and may be present in any programming language and/or in machine language.

The object is additionally achieved according to the invention by a computer-readable data carrier on which a computer program as described above is stored. The data carrier may be an integral part of the control device described above or may be designed separately from the control device. The data carrier has a memory in which the computer program is stored. The memory is any suitable type of memory based for example on magnetic and/or optical data storage.

BRIEF DESCRIPTION OF THE DRAWINGS

Further advantages and properties of the invention will become apparent from the following description and the accompanying drawings, to which reference is made. In the figures.

DESCRIPTION

Figure 1:
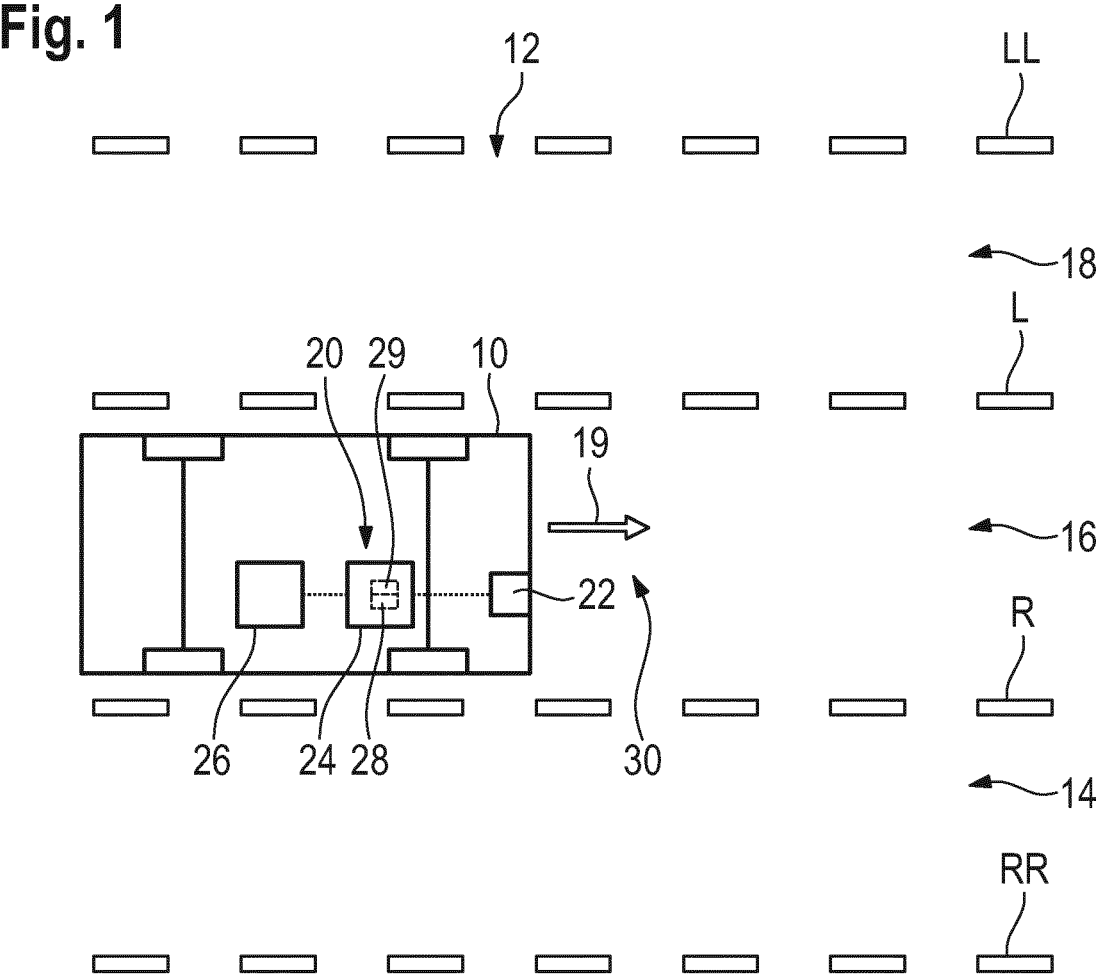
FIG. 1 schematically shows a motor vehicle having a system according to the invention for determining a vehicle corridor.

FIG. 1 schematically shows a motor vehicle 10 that is located on a multi-lane road 12 that has a first lane 14, a second lane 16 and a third lane 18. A direction of travel of the motor vehicle 10 is indicated in this case in FIG. 1 by an arrow 19.

The first lane 14 is delimited in this case on the right by a road marking RR and on the left by a road marking R. The second lane 16 is accordingly delimited on the right by the road marking R and on the left by a road marking L. The third lane 18 is delimited on the right by the road marking L and on the left by a road marking LL.

The second lane 16 is the current lane of the motor vehicle 10, while the first lane 14, viewed in the direction of travel, runs to the right of the second lane 16 and the third lane 18 runs to the left of the second lane 16.

The motor vehicle 10 has a system 20 for determining a driving corridor of the motor vehicle 10, having a camera 22 and a control device 24 that is connected to the camera 22 so as to transmit signals. A machine learning module 28 containing an artificial neural network is implemented on the control device 24, the operation of which will be explained in more detail later.

The artificial neural network constitutes a computer program that is stored on a data carrier 29 of the control device 24.

The motor vehicle 10 furthermore has a further control device 26 that is connected to the control device 24 so as to transmit signals and is designed to control the motor vehicle 10 in an at least partially automated manner, in particular in a fully automated manner. In other words, a driver assistance system is implemented on the further control device 26 and is able to control a transverse movement and/or a longitudinal movement of the motor vehicle 10 in an at least partially automated manner, in particular in a fully automatic manner.

As an alternative thereto, the two control devices 24, 26 may also be sub-control devices of a single control device.

The driver assistance system, which in the present case is for example a lane keeping assistant or a lane change assistant, requires information about the surroundings of the motor vehicle 10 in order to control the motor vehicle 10 in an at least partially automated manner.

This information about the surroundings of the motor vehicle 10 is provided by the system 20. In general terms, the system 20 is designed to create images of a front area 30 ahead of the motor vehicle 10 by way of the camera 22, to process these images by way of the control device 24, and thus to determine a current driving corridor of the motor vehicle 10 and/or at least one driving corridor adjacent to the current driving corridor of the motor vehicle 10.

Here and hereinafter, a "driving corridor" is understood to be an area on the road 12, on a track or the like in which the motor vehicle 10 is able to move safely. This is for example one of the lanes 14, 16, 18 or an area of an unmarked road or of a track that corresponds to a lane. The "current driving corridor" is accordingly understood to be that driving corridor in which the motor vehicle 10 is currently located and in which the motor vehicle 10 is able to continue to move safely.

A distinction should thus be drawn between the terms "driving corridor" and "lane" used above. The driving corridor is that area of the road 12 or of a track that is recognized by the control device 24 as a safely passable area, while the lanes 14, 16, 18 denote the areas of the road 12 that are delimited by the road markings RR, R, L, LL. Of course, at least one of the driving corridors and at least one of the lanes 14, 16, 18 may coincide, but this is not necessarily the case.

Figure 2:
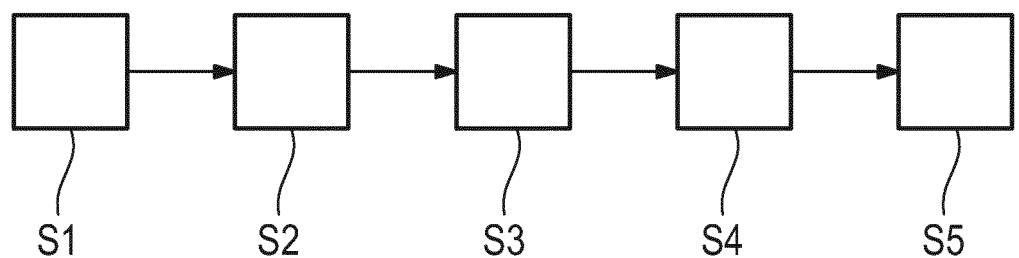
FIG. 2 shows a schematic flowchart of the steps of a method according to the invention for determining a vehicle corridor.

The exact operation of the system 20 and the individual steps of a method for determining the driving corridor for the motor vehicle 10 are explained below with reference to FIG. 2.

Images of the front area 30 ahead of the motor vehicle 10 are recorded by way of the camera 22 and forwarded to the control device 24 (step S1).

Characteristic image features of the individual images are then extracted by way of the machine learning module 28, more precisely by way of the artificial neural network (step S2). In the course of this extraction of the characteristic image features, individual image areas of the individual images are grouped into one or more of the following categories: Road, no road, passable track, impassable terrain, road marking, road boundary, traffic sign, motor vehicle, cyclist, pedestrian, other road user, etc.

In step S2, at least those image areas that are relevant for determining the at least one driving corridor are thus identified and categorized.

Of course, the road markings RR, R, L, LL shown in FIG. 1 are an indication of the presence of a driving corridor. However, they are not necessarily used as the only feature for determining the at least one driving corridor, since the road markings RR, R, L, LL may be incorrect or simply absent in some road sections, for example in the area of construction sites.

Image points 32 that laterally delimit the at least one driving corridor are then determined by way of the same artificial neural network (step S3). This step is explained in more detail below with reference to FIG. 3, which shows a camera image of a situation that is highly similar to the situation shown in FIG. 1. The motor vehicle 10 is located in the central second lane 16. The third lane 18 and the first lane 14 run to the left and to the right, respectively, of the second lane 16.

The image points 32 are determined along four search lines 34, which run through the image along the width direction b of the image with a constant height coordinate $h_{k1}$–$h_{k4}$. In other words, the image points 32 are ascertained based on four search values, wherein the search values are the height coordinate h of the respective search line 34. Of course, any other number of search lines 34 is also possible.

Since the at least one driving corridor has a left-hand and a right-hand boundary, a respective pair of two image points 32 is determined along each of the search lines 34. One of the image points 32 of the pair in this case constitutes the left-hand boundary of the driving corridor and the other of the image points 32 of the pair constitutes the right-hand boundary of the driving corridor level with the respective search line 34.

In step S3, at least eight image points 32 that delimit the current lane of the motor vehicle 10 are thus ascertained.

Figure 3:
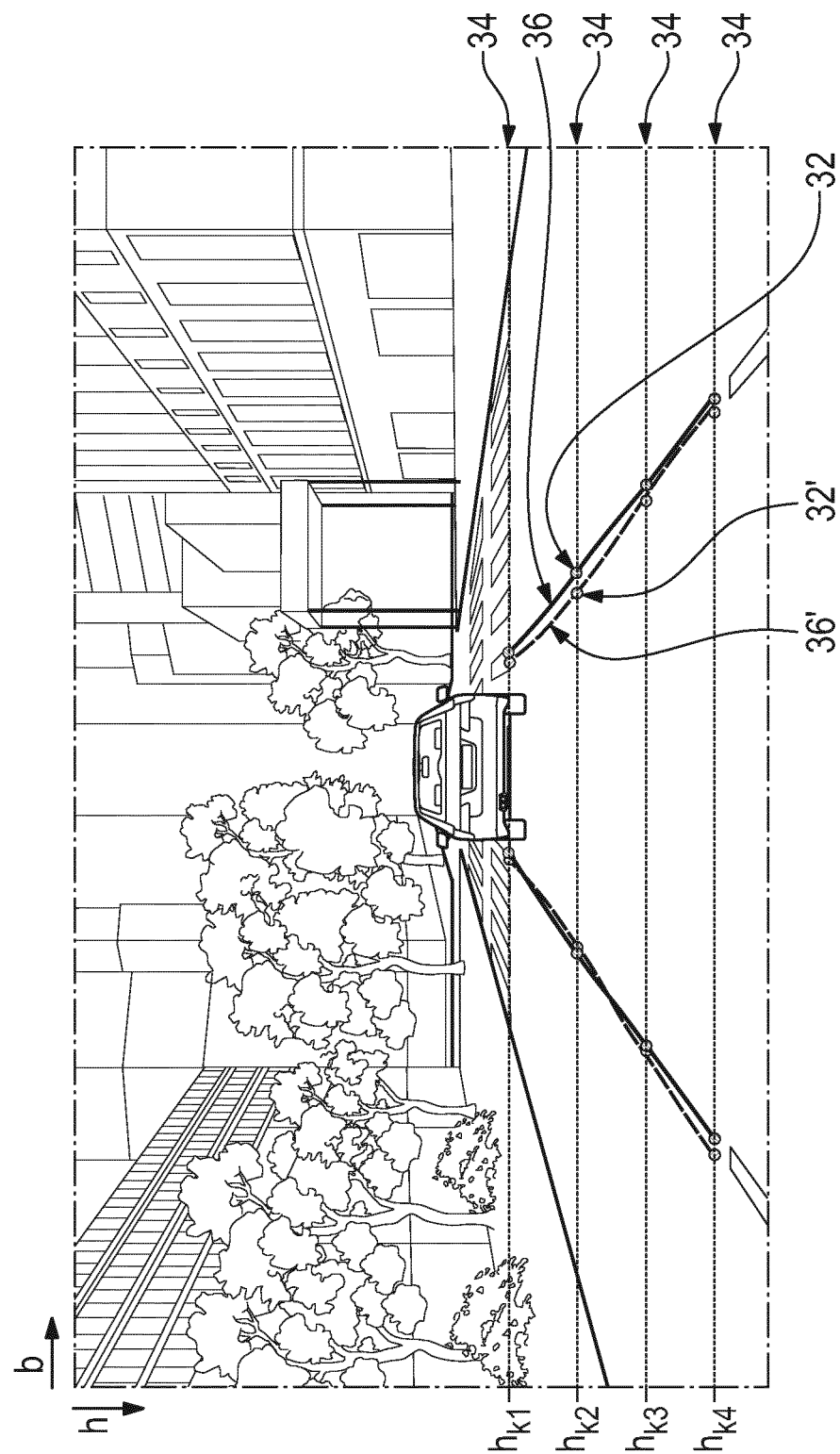
FIG. 3 schematically shows an image processed in accordance with the method from FIG. 2.

It should be noted that FIG. 3 shows only those image points 32 that delimit the current driving corridor, corresponding to the second lane 16, of the motor vehicle 10. It is of course possible to determine further image points that delimit further driving corridors, in the same way as the case described above. Adjacent driving corridors in this case share those image points 32 that separate the adjacent driving corridors from one another. In the case of the three lanes 14, 16, 18 shown in FIG. 3, which correspond to three driving corridors, 16 image points would therefore be ascertained.

At least two result curves 36 that laterally delimit the current driving corridor of the motor vehicle 10 are then ascertained based on the determined image points 32 (step S4).

One of the result curves 36 thus delimits the current driving corridor of the motor vehicle 10 on the left and is ascertained by interpolating those four image points 32 that delimit the current driving corridor on the left.

In the same way, the other of the two result curves 36 delimits the current driving corridor of the motor vehicle 10 on the right and is ascertained by interpolating those four image points 32 that delimit the current driving corridor on the right.

More precisely, the two result curves 36 are determined based on the image coordinates, that is to say the respective height coordinate h and the respective width coordinate b of the image points 32. The determined image points 32 thus constitute support points for the result curves 36.

The result curves 36 are in each case a cubic spline, a Bezier spline or another type of curve suitable for interpolating the image points 32.

The result curves 36 may likewise be ascertained by the artificial neural network. As an alternative, the result curves 36 may however also be ascertained outside the machine learning module 28, for example by a corresponding module that runs on the control device 24.

The determined image points 32, the result curve 36 and/or further information, based on the determined image points 32, about the current vehicle corridor or vehicle corridors adjacent thereto are then transmitted to the further control device 26 (step S5).

Depending on exactly what information is contained in the transmitted signal, the motor vehicle 10 may be controlled in different ways by the further control device 26.

If for example only information about the current driving corridor is contained, then the information is sufficient for a lane keeping assistant, but is insufficient for a lane change assistant. Information about at least one driving corridor adjacent to the current driving corridor additionally has to be available for the lane change assistant.

At least steps 32 and 33 described above, in particular also step 34, are thus carried out by the same artificial neural network. There are in principle various suitable architectures for the artificial neural network that are able to be trained to perform the method described above.

Figure 4:
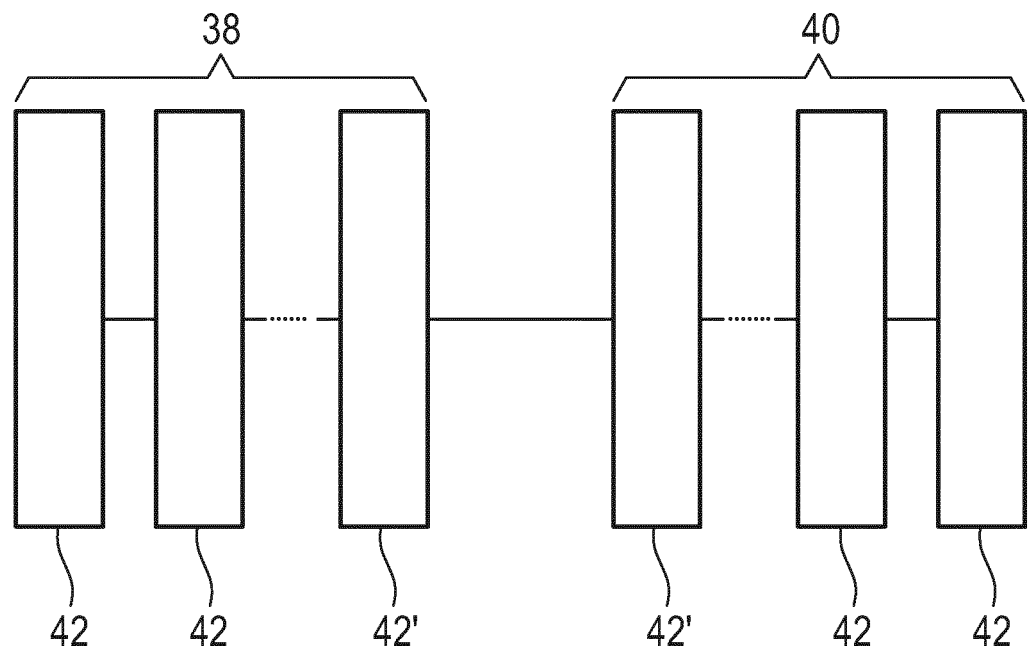
FIG. 4 schematically shows a structure of an artificial neural network that is used for the method from FIG. 2.

One exemplary architecture of the artificial neural network is shown in FIG. 4. The artificial neural network has a first subnetwork 38 and a second subnetwork 40, wherein at least the first subnetwork 38 is in the form of a convolutional neural network (CNN), in particular of a deep convolutional neural network.

The first subnetwork 38 and the second subnetwork 40 each have a plurality of layers 42. The layers 42 within the respective subnetworks 38, 40 are in this case fully connected to their respective adjacent layers 42, and these are thus what are known as "fully connected" (FC) layers. The individual neurons of the respective layers 42 are thus each connected to all of the neurons of the adjacent layers 42.

The two outer layers 42 of the two subnetworks 38, 40, which are located next to one another at the boundary between the two subnetworks 38, 40, are preferably also fully connected to one another. In other words, an output layer of the first subnetwork 38 is thus fully connected to an input layer of the second subnetwork 40.

The artificial neural network thus comprises two interconnected subnetworks 38, 40. As will be explained in more detail below, the first subnetwork 38 is trained to extract the characteristic image features, that is to say to perform step S2, while the second subnetwork 40 is trained to determine the image points 32 based on the characteristic image features extracted by the first subnetwork 38, in particular by way of regression analysis. The first subnetwork 38 thus carries out step S2, while the second subnetwork 40 carries out step S3 and possibly step S4.

Steps S1 and S5 may also be performed by these two subnetworks 38, 40 or other parts of the artificial neural network.

Figure 5:
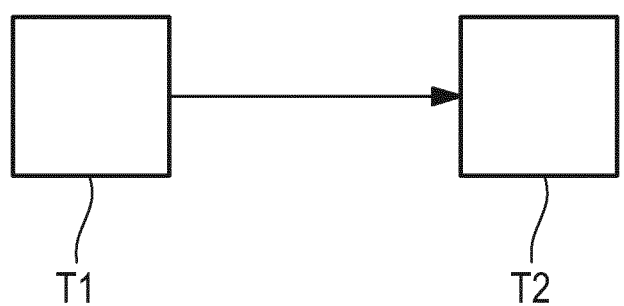
FIG. 5 schematically shows a flowchart of the training steps for the artificial neural network from FIG. 4.

In order to guarantee optimum results when determining the at least one driving corridor, the neural network should of course be trained prior to use in the system 20. To this end, provision is made for the following training steps described with reference to FIG. 5 before use.

First of all, the first subnetwork 38 is trained to extract the characteristic image features in the images generated by way of the camera 22 (step T1), that is to say to perform step S2 described above.

For this purpose, the artificial neural network, in particular only the first subnetwork 38, is supplied with target training data that contain images generated by way of the camera 22 and information about actual characteristic image features present in the images.

The artificial neural network, in particular the first subnetwork 38, then extracts the characteristic image features from the target training data, more precisely from the images contained therein.

An error, or rather a discrepancy between the ascertained characteristic image features and the actual characteristic image features, is then determined, and the error is fed back to the artificial neural network. Weighting factors of the artificial neural network are in this case adjusted such that the error or the discrepancy is minimized.

In the same way, in training step T1, the artificial neural network may also be trained to ascertain a number of existing driving corridors.

The training steps T1 and T2 may also contain a plurality of substeps or phases.

The artificial neural network trained beforehand in training step T1 is then trained, in a second training step, to determine the image points 32 based on the extracted characteristic image features.

For this purpose, the artificial neural network is supplied with target training data that contain images generated by way of the camera 22 and information about actual image points 32 present in the images. The first subnetwork 38 extracts the characteristic image features from the target training data, more precisely from the images contained therein, and transfers them to the second subnetwork 40. The second subnetwork 40 determines the image points 32 from the target training data based on the extracted characteristic image features.

Figure 6:
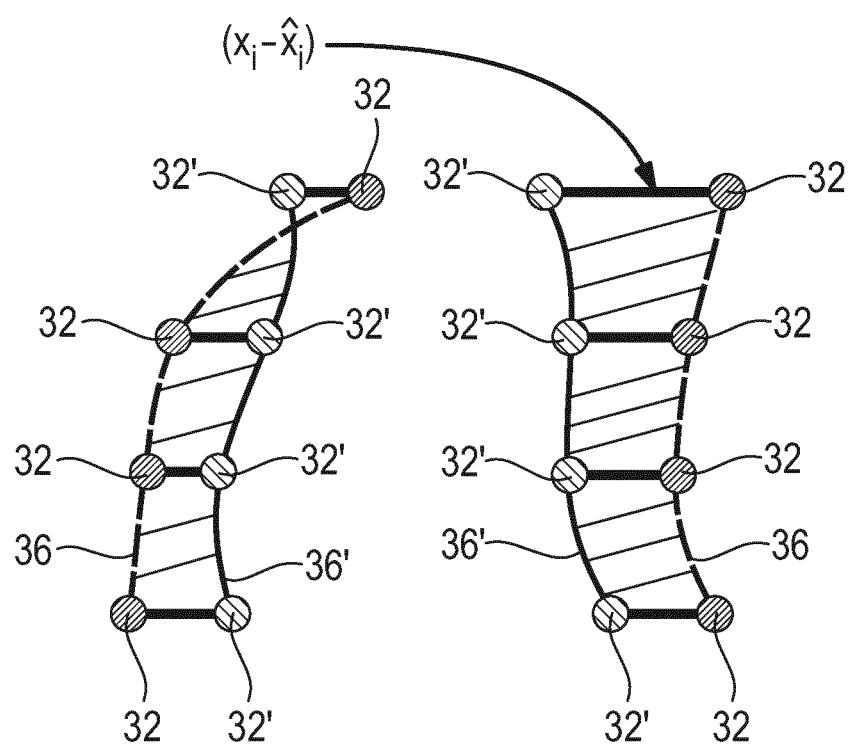
FIG. 6 shows an illustration of the error determination during the training steps of FIG. 5.

An error between the ascertained image points 32 and the actual image points 32 is then determined, as illustrated with reference to FIG. 6. A measure of the error at each individual one of the image points 32 is in this case the Euclidean distance between the ascertained image point 32 and the respectively associated actual image point 32'.

If $X_i$ (i is a natural number) is thus the width coordinate b of the actual ith image point 32' and $\hat{x}_i$ is the width coordinate of the associated image point 32 ascertained by the neural network, then the error associated with this image point 32 works out as $(x_i, \hat{x}_i)^2$. In this case, only the width coordinate of the image point 32 is taken into account, since the height coordinate is set to the respective search value.

The total error is calculated as the sum or as a weighted average of the errors of all of the image points 32, that is to say the error results as $$L_2 = \frac{1}{4N} \sum_{i=1}^{4N} (x_i - \hat{x}_i)^2.$$

In this case, N denotes the number of relevant boundary lines. In the case of a single driving corridor, N is thus equal to 2.

As an alternative to the error function $L_2$, it is also possible to use an error function that is based on the Euclidean distance between points on the ascertained result curves 36 and the corresponding actual result curves 36'.

In this case, the result curve 36 or the actual result curve 36' is thus first of all determined based on the image points 32 and the actual image points 32'. The Euclidean distances between the points corresponding to one another on the result curves 36 and 36' are then calculated, it also being possible to consider points that are different from the image points 32, that is to say have a height coordinate different from the image points 32.

In both cases described above, the error is then fed back to the artificial neural network. In this case, weighting factors of the second subnetwork 40, but also of the first subnetwork 38, are adjusted such that the error or the discrepancy is minimized.

It should be pointed out that, following the training steps described above, a boundary between the two subnetworks 38, 40 may possibly no longer be able to be established in a fault-free manner, since weighting factors of the first subnetwork 38 are also adjusted in the second training step T2, meaning that the boundary between the two subnetworks 38, 40 becomes blurred.

The artificial neural network trained in this way is then configured so as to perform steps S1 to S5.

The invention claimed is:

1. A method for determining a driving corridor for a motor vehicle that has at least one camera and a control device, wherein the camera is designed to generate images of a front area ahead of the motor vehicle and to forward them to the control device, and wherein the control device comprises a machine learning module containing an artificial neural network, the method comprising:
 obtaining an image of the front area ahead of the motor vehicle that includes the driving corridor from the at least one camera;
 extracting characteristic image features of the image to classify a type of the driving corridor by way of the artificial neural network; and
 determining a first pair of image points at a first search value of the image, the first search value being provided as input to the artificial neural network, and a second pair of image points at a second search value of the image, the second search value being provided as input to the artificial neural network, that delimit the driving corridor of the motor vehicle and/or at least one driving corridor adjacent to the driving corridor by way of the same artificial neural network, based on the extracted characteristic image features, the first search value and the second search value,
 wherein each image point of the first pair of image points and the second pair of image points includes a height coordinate and a width coordinate, wherein the first search value and the second search value correspond to the height coordinate of the first pair of image points and the second pair of image points respectively, and wherein only the height coordinate of the image point is provided as input to the artificial neural network and the artificial neural network outputs the width coordinate of the image point, and
 wherein the first search value defines a first distance from the motor vehicle in the front area ahead of the motor vehicle and the second search value defines a second distance, different than the first distance, from the motor vehicle in the front area ahead of the motor vehicle.

2. The method as claimed in claim 1, wherein the extraction of the characteristic image features corresponds to a classification of image areas of the image into one or more categories including a road type and a no-road type.

3. The method as claimed in claim 1, wherein the first pair of image points correspond to a left-hand boundary of at least one of the driving corridors and a right-hand boundary of the same driving corridor at the first search value and the second pair of image points correspond to the left-hand boundary of the at least one of the driving corridor and the right-hand boundary of the same driving corridor at the second search value.

4. The method as claimed in claim 3,
 wherein the first pair of image points and the second pair of image points have an image point that is assigned to the left-hand boundary of a driving corridor and an image point that is assigned to the right-hand boundary of the same driving corridor, and
 wherein the method further comprises determining a left-hand boundary result curve based on the image points assigned to the left hand boundary from the first pair of image points and the second pair of image points and a right-hand boundary result curve based on the image points assigned to the right hand boundary from the first pair of image points and the second pair of image points.

5. The method as claimed in claim 1, wherein the artificial neural network has at least one first subnetwork and at least one second subnetwork, wherein the first subnetwork, which is a convolutional network, extracts the characteristic image features and/or wherein the second subnetwork, which is a regression-based network, determines the image points.

6. The method as claimed in claim 5, wherein the first subnetwork is trained in a first training step with target training data that contain images generated by way of the camera and information about actual characteristic image features present in the images, and wherein the second subnetwork is then trained in a second training step with target training data that contain characteristic image features obtained from the first subnetwork and corresponding actual image points delimiting at least one of the driving corridors.

7. The method as claimed in claim 1, wherein the artificial neural network is trained with target training data, wherein the target training data comprise images generated by way of the camera and information about actual characteristic image features present in the images and/or actual image points delimiting at least one driving corridor, comprising the following training steps:
 forward-feeding the target training data to the artificial neural network;
 ascertaining characteristic image features and/or image points delimiting the at least one driving corridor by way of the artificial neural network;
 determining an error between the ascertained characteristic image features and the actual characteristic image features and/or determining an error between the ascertained image points and the actual image points; and
 changing weighting factors of the neural network by feeding back the error to the artificial neural network.

8. The method as claimed in claim 7, wherein squared Euclidean distances between the ascertained image points and the actual image points and/or between points on at least one result curve and points on a corresponding actual result curve are used to ascertain the error, in particular wherein the respective squared Euclidean distances are summed and/or averaged.

9. The method as claimed in claim 8, wherein the determined image points, the one or more result curves and/or further information, based on the determined image points, about the determined driving corridor are transmitted to at least one driver assistance system of the motor vehicle.

10. The method as claimed in claim 7, wherein the target training data additionally contain an actual number of existing driving corridors, such that the artificial neural network is additionally trained to ascertain the number of driving corridors.

11. A control device for a system for determining a driving corridor for a motor vehicle, the control device comprising a machine learning module that includes an artificial neural network, wherein the control device is configured to:

obtain an image of a front area ahead of the motor vehicle that includes the driving corridor from at least one camera;

extract characteristic image features of the image to classify a type of the driving corridor by way of the artificial neural network; and determine a first pair of image points at a first search value of the image, the first search value being provided as input to the artificial neural network, and a second pair of image points at a second search value of the image, the second search value being provided as input to the artificial neural network, that delimit the driving corridor of the motor vehicle and/or at least one driving corridor adjacent to the driving corridor by way of the same artificial neural network, based on the extracted characteristic image features, the first search value and the second search value, wherein each image point of the first pair of image points and the second pair of image points includes a height coordinate and a width coordinate, wherein the first search value and the second search value correspond to the height coordinate of the first pair of image points and the second pair of image points respectively, and wherein only the height coordinate of the image point is provided as input to the artificial neural network and the artificial neural network outputs the width coordinate of the image point, and wherein the first search value defines a first distance from the motor vehicle in the front area ahead of the motor vehicle and the second search value defines a second distance, different than the first distance, from the motor vehicle in the front area ahead of the motor vehicle.

12. A system for determining a driving corridor for a motor vehicle, the system comprising:

a control device; and at least one camera that is designed to generate images of a front area ahead of the motor vehicle and to forward them to the control device, wherein the control device is configured to:

obtain an image of the front area ahead of the motor vehicle that includes the driving corridor from the at least one camera;

extract characteristic image features of the image to classify a type of the driving corridor by way of the artificial neural network; and determine a first pair of image points at a first search value of the image, the first search value being provided as input to the artificial neural network, and a second pair of image points at a second search value of the image, the second search value being provided as input to the artificial neural network, that delimit the driving corridor of the motor vehicle and/or at least one driving corridor adjacent to the driving corridor by way of the same artificial neural network, based on the extracted characteristic image features, the first search value and the second search value, wherein each image point of the first pair of image points and the second pair of image points includes a height coordinate and a width coordinate, wherein the first search value and the second search value correspond to the height coordinate of the first pair of image points and the second pair of image points respectively, and wherein only the height coordinate of the image point is provided as input to the artificial neural network and the artificial neural network outputs the width coordinate of the image point, and wherein the first search value defines a first distance from the motor vehicle in the front area ahead of the motor vehicle and the second search value defines a second distance, different than the first distance, from the motor vehicle in the front area ahead of the motor vehicle.

\* \* \* \* \*